(12) United States Patent
Odate

(10) Patent No.: US 7,828,105 B2
(45) Date of Patent: Nov. 9, 2010

(54) SEATBELT DEVICE FOR VEHICLE AND CONTROL METHOD THEREOF

(75) Inventor: Shotaro Odate, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 213 days.

(21) Appl. No.: 12/172,479

(22) Filed: Jul. 14, 2008

(65) Prior Publication Data

US 2009/0020997 A1 Jan. 22, 2009

(30) Foreign Application Priority Data

Jul. 20, 2007 (JP) ............................. 2007-189510

(51) Int. Cl.
*B60R 21/00* (2006.01)
(52) U.S. Cl. .................................... 180/268; 701/45
(58) Field of Classification Search ................ 180/268; 280/807; 701/45
See application file for complete search history.

(56) References Cited

U.S. PATENT DOCUMENTS

| | | | |
|---|---|---|---|
| 4,655,312 A * | 4/1987 | Frantom et al. ............. 180/268 |
| 4,817,885 A * | 4/1989 | Matsumoto ............... 242/382.2 |
| 5,005,777 A | 4/1991 | Fernandez | |
| 5,474,247 A | 12/1995 | Bareiss | |
| 6,827,308 B2 | 12/2004 | Fujii et al. | |
| 7,374,206 B2 * | 5/2008 | Nomura ....................... 280/807 |
| 2002/0166916 A1 | 11/2002 | Fujii et al. | |
| 2006/0113418 A1 * | 6/2006 | Nomura ....................... 242/374 |
| 2006/0113419 A1 * | 6/2006 | Nomura ....................... 242/374 |
| 2006/0113420 A1 * | 6/2006 | Nomura ....................... 242/374 |
| 2006/0118674 A1 * | 6/2006 | Nomura ....................... 242/374 |
| 2006/0214043 A1 * | 9/2006 | Nomura ....................... 242/374 |
| 2008/0264710 A1 * | 10/2008 | Odate et al. .................. 180/268 |
| 2009/0024283 A1 * | 1/2009 | Odate et al. ................... 701/45 |

FOREIGN PATENT DOCUMENTS

| EP | 1619092 A1 | 1/2006 |
|---|---|---|
| JP | 06-286581 | 10/1994 |

* cited by examiner

*Primary Examiner*—Paul N Dickson
*Assistant Examiner*—Drew Brown
(74) *Attorney, Agent, or Firm*—Rankin, Hill & Clark LLP

(57) ABSTRACT

A seatbelt device for a vehicle provided with: a webbing that restrains a passenger seated on a seat; a belt reel on which the webbing is wound; a motor that rotation-drives the belt reel; a motor control device that controls the motor; an input determination device that determines whether or not an input signal from a seatbelt operation section including the webbing is an artificial input signal; and a command output device that outputs a setting change command to the motor control device according to a determination result from the input determination device.

5 Claims, 5 Drawing Sheets

SEATBELT DEVICE FOR VEHICLE AND CONTROL METHOD THEREOF

BACKGROUND OF THE INVENTION

Priority is claimed on Japanese Patent Application No. 2007-189510, filed Jul. 20, 2007, the contents of which are incorporated herein by reference.

1. Field of the Invention

The present invention relates to a seatbelt device that restrains a passenger seated on a vehicle seat with webbing, in particular, to a seatbelt device for a vehicle provided with a pretensioner mechanism that uses a motor, and a control method thereof.

2. Description of the Related Art

In recent years, there has been brought into practical application a seatbelt device for a vehicle in which a motor for rotation-driving a belt reel is provided, and the tension force of webbing is controlled by driving of the motor so as to stabilize the posture of the passenger when an emergency arises or the traveling state is unstable (for example, refer to Japanese Unexamined Patent Application, First Publication No. H06-286581).

In this seatbelt device, there are provided an emergency restraining device that uses an explosive force of an explosive to rapidly pull in the webbing with a significant force when a significant impact caused by a collision or the like is received, and a pretensioner mechanism that uses a motor to pull in the webbing when an imminent collision is detected.

Incidentally, in this conventional seatbelt device, the velocity or torque for pulling in the webbing, and the looseness removal amount are determined by a program pre-stored in a controller. In recent years however, there has been a demand for these settings to be freely fine-adjusted by a user or dealer according to the preference or body shape of the passenger.

However in recent vehicles, many switches of control equipment are already disposed inside the passenger compartment. In such circumstances, it is not preferable to add a dedicated setting switch for a seatbelt device inside the passenger compartment, from the viewpoint that operation of other switches is obstructed, and the design of the passenger compartment is impaired.

Consequently, an object of the present invention is to provide a seatbelt device for a vehicle and a control method thereof, capable of changing the control settings of a motor used for webbing winding, without the need for adding a dedicated setting switch, to achieve a simplified structure of the interior of a passenger compartment.

SUMMARY OF THE INVENTION

In order to solve the above problems, the present invention employs followings.

That is to say, a seatbelt device for a vehicle of the present invention is provided with: a webbing that restrains a passenger seated on a seat; a belt reel on which the webbing is wound; a motor that rotation-drives the belt reel; a motor control device that controls the motor; an input determination device that determines whether or not an input signal from a seatbelt operation section including the webbing is an artificial input signal; and a command output device that outputs a setting change command to the motor control device according to a determination result from the input determination device.

According to the above seatbelt device for a vehicle, if a signal from the seatbelt operation section including the webbing is input to the input determination device, it is determined in the input determination device whether or not the input signal is an artificial input signal. If the input signal is an artificial input signal, the command output device outputs a setting change command to the motor control device according to the input signal.

Therefore, the setting of the motor control device can be changed by artificially operating the seatbelt operation section. As a result, the control settings of the motor can be reliably changed without the need for adding a dedicated setting switch. Therefore, according to the present invention, the structure of the interior of the passenger compartment can be simplified, and the degree of freedom in setting the seatbelt device can be increased.

It may be arranged such that: the seatbelt device for a vehicle further includes a winding position detection device that detects the winding position of the belt reel; and the input determination device receives a detection signal from the winding position detection device, and if a winding position signal continues to be greater than or equal to a set value for a predetermined period of time or longer, determines a subsequent signal as an artificial input signal.

In this case, if the passenger holds and pulls the webbing for a predetermined period of time or longer, the input determination device determines the subsequent signal as an artificial input signal. As a result, a setting change command is output from the command output device to the motor control device, based on the artificial input signal.

Therefore, by a simple operation of a passenger to hold the webbing and pull for a predetermined period of time or longer, an artificial input signal can be accepted in the input determination device. As a result, the operability at the time of setting change can be improved.

The artificial input signal input to the input determination device may include at least either one of; a detection signal of a winding position detection device that detects a winding position of the belt reel, and a signal of a buckle switch that detects whether or not a seatbelt buckle is attached.

In this case, since either one of; a detection signal of the winding position detection device, and a signal of the buckle switch is used as an artificial input signal, the control setting of the motor can be easily changed by the seated passenger.

Moreover, the present invention control method of a vehicle seatbelt device provided with: a webbing that restrains a passenger seated on a seat; a belt reel on which the webbing is wound; a motor that rotation-drives the belt reel; a motor control device that controls the motor; and a seatbelt operation section including the webbing, includes: a winding position detection step of detecting the winding position of the belt reel; an input determination step of determining based on a detection result in the winding position detection step, whether or not a subsequent input signal is an artificial input signal due to an operation of the seatbelt operation section; and a setting change step of outputting a setting change command to the motor control device in a case where a subsequent input signal is determined as an artificial input signal in the input determination step.

According to the above control method of a vehicle seatbelt device: the winding position of the belt reel is detected in the winding position detection step; it is determined with use of the detection result whether or not the subsequent input is artificial; and a setting change command of the motor control device is output if the input is determined as artificial. Therefore, the control setting of the motor can be reliably changed without the need for adding a dedicated setting switch.

DETAILED DESCRIPTION OF THE INVENTION

Hereunder, an embodiment of the present invention is described, with reference to the drawings.

Figure 1:
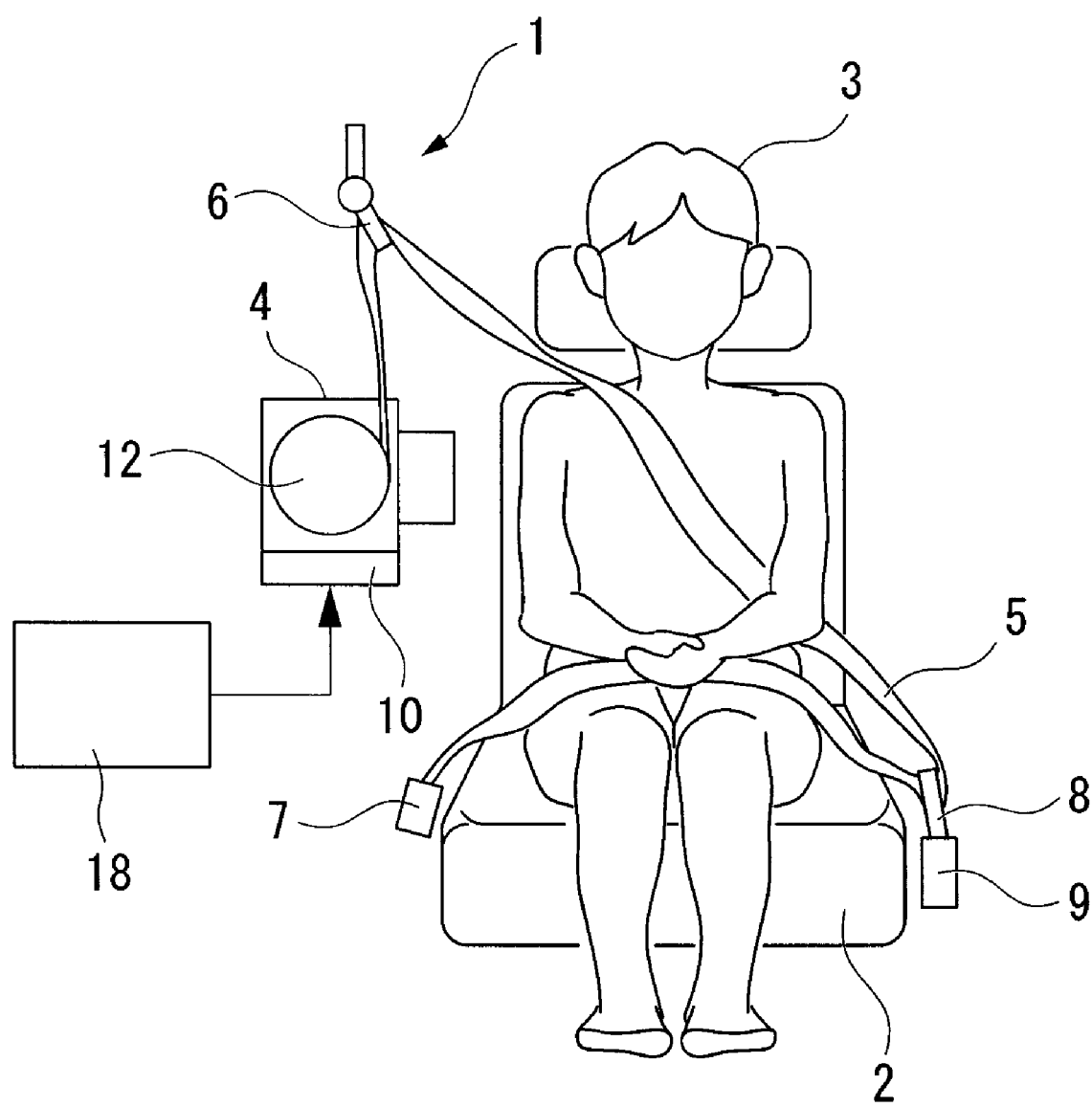
FIG. 1 is an overall schematic block diagram of a seatbelt device showing an embodiment of the present invention.

FIG. 1 shows an overall schematic configuration of a seatbelt device 1 according to the present invention. Reference symbol 2 in the drawing denotes a seat on which a passenger 3 is to be seated. The seatbelt device 1 of the present embodiment is a so called three point seatbelt type device in which a webbing 5 is pulled out upward from a retractor 4 attached to a center pillar (not shown in the drawing). The webbing 5 is inserted through a through anchor 6 supported on the upper side of the center pillar, and the tip end of the webbing 5 is fixed on a vehicle body floor via an outer anchor 7 on the passenger compartment outer side of the seat 2. Between the through anchor 6 and the outer anchor 7 of the webbing 5, the webbing 5 is threaded through a tongue plate 8. The tongue plate 8 can be attached to or removed from a seatbelt buckle 9 fixed on the vehicle body floor on the passenger compartment inner side of the seat 2.

The webbing 5 is wound up on the retractor 4 in the initial state, and the passenger 3 uses their hand to pull it out and fix the tongue plate 8 to the seatbelt buckle 9, and mainly the chest and hip of the passenger 3 are thereby restrained in the seat 2. In the case of this seatbelt device 1, in the event of a collision or rollover, the webbing 5 is pulled in by an electric motor 10 and an explosive ignition, and the motor 10 constitutes a pretensioner mechanism.

Figure 2:
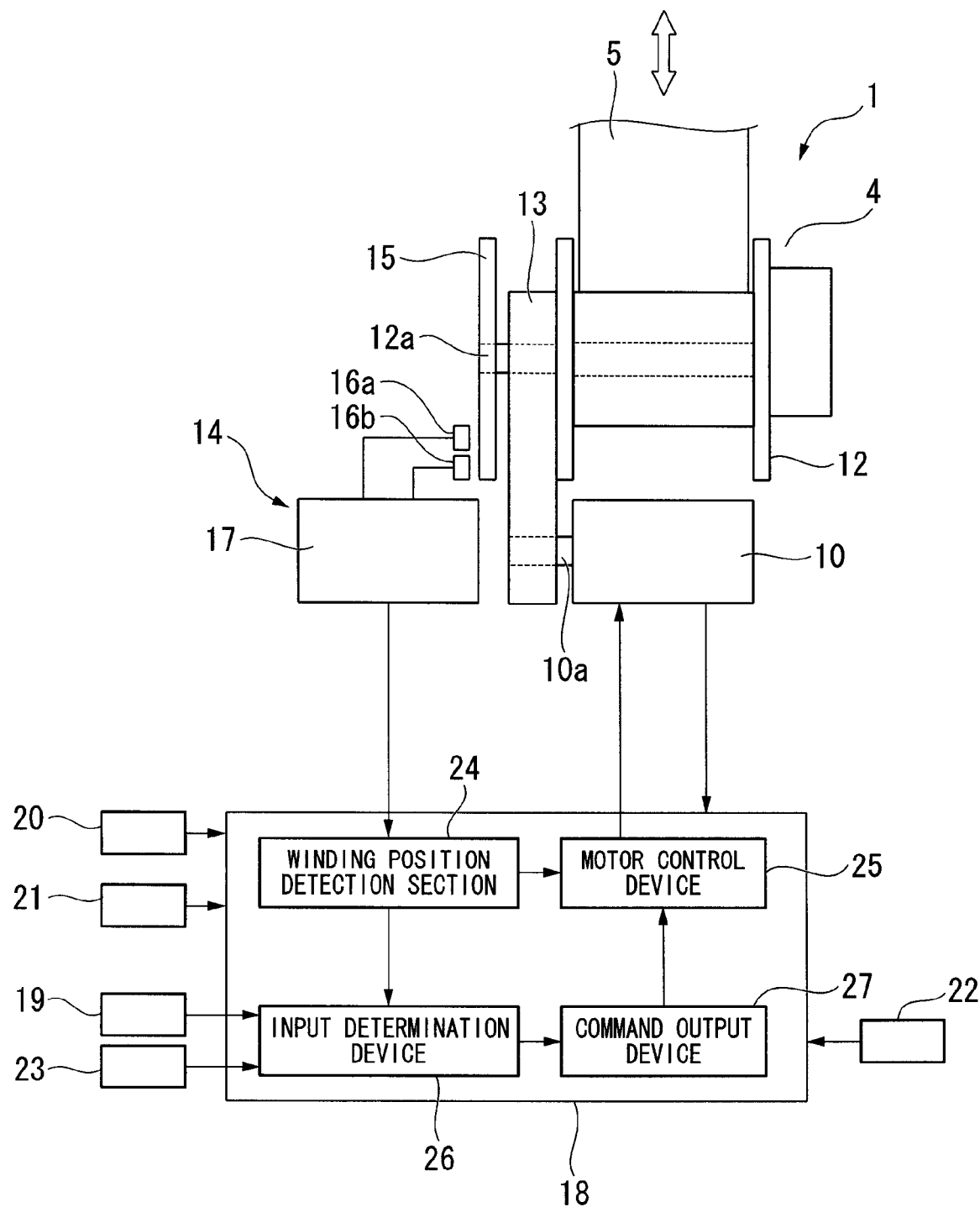
FIG. 2 is a schematic block diagram of the seatbelt device of the same embodiment, focusing on a controller.

As shown in FIG. 2, the retractor 4 is such that the webbing 5 is wound on a belt reel 12 rotatably supported on a casing (not shown in the drawing), and a shaft 12a of the belt reel 12 projects towards one end side of the casing. The shaft 12a of the belt reel 12 is interlockably connected, via a power transmission mechanism 13 including a power cut-off clutch (not shown in the drawing), to a rotation shaft 10a of the motor 10. Moreover, within the retractor 4 there is housed a winding spring (not shown in the drawing) for biasing the belt reel 12 in the winding direction. In a state where the belt reel 12 and the motor 10 are separated by an OFF operation of the clutch, the tension force caused by the winding spring acts on the webbing 5.

Furthermore, on the shaft 12a of the belt reel 12, there is provided a rotation sensor 14 (winding position detection device) that detects rotation of the shaft 12a. The rotation sensor 14, for example, has: a magnetic disk 15 having different magnetic polarities alternately magnetized around the circumferential direction thereof, a pair of Hall elements 16a and 16b disposed in close proximity to the outer circumference of the magnetic disk 15; and a sensor circuit 17 that processes detection signals from the Hall elements 16a and 16b. Pulse signals that have been processed in the sensor circuit 17 are output to a controller 18.

The pulse signals that are input from the sensor circuit 17 to the controller 18 according to the rotation of the belt reel 12, are used in the controller 18 basically as feedback signals for driving the motor 10. That is to say, in the controller 18, by counting the pulse signals, the rotation amount of the belt reel 12 (the amount of webbing 3 being pulled out) is detected. Moreover, the rotational velocity of the belt reel 12 (velocity of pulling out the webbing 5) is found by calculating the change rate (frequency) of the pulse signals. Furthermore, the rotation direction of the belt reel 12 is detected by comparing initial rises of the waveforms of both of the pulse signals.

To the controller 18, there are connected a buckle switch 19 that detects the connection state of the seatbelt buckle 9, a forward object detection device 20 (traveling state detection device) such as a radar that detects objects in front of the vehicle, an acceleration sensor 21 that detects vehicle acceleration in the front-rear/left-right directions, a vehicle speed sensor 22 that detects traveling speed of the vehicle, and a shift position sensor 23 of an automatic transmission device.

Incidentally, the winding load of the webbing 5, the winding speed of the webbing 5, the looseness removal amount, and so forth are pre-set in the seatbelt device 1 for emergency. However, these control setting values can be changed by operations performed by a user or dealer. A change to these control settings is executed by a special operation described later to pull out the webbing 5.

The controller 18 is provided with: a winding position detection device 24 that receives a signal from the rotation sensor 14 and calculates the rotation position of the belt reel 12; a motor control device 25 that controls driving of the motor 10; an input determination device 26 that receives a signal from the winding position detection device 24 and determines whether or not the passenger is performing an artificial signal input operation, and only if an artificial signal input operation is determined, accepts a subsequent signal as an artificial input signal; and a command output device 27 that receives the signal accepted by the input determination device 26 and outputs a setting change command to the motor control device 25. The setting change command output from the command output device 27 includes for example, a command to increase/reduce the electric current amount (command to increase/reduce winding load), a command to increase/reduce the rotation speed (command to increase/reduce winding speed), and a command to increase/reduce the amount of looseness removal (command to increase/reduce the amount of webbing 5 pulled in when removing looseness).

In the seatbelt device 1, when the passenger 3 holds the webbing 5 and artificially pulls in and winds back the webbing 5, these artificial operations are accepted as an input signal, and a setting change in the motor control device 25 is enabled. In the present embodiment, in the case where pulling-out of the webbing 5 for a set amount or more continues for a predetermined period of time or longer, the input determination device 26 accepts the subsequent input signal caused by the webbing 5, and a command according to the input signal is output in the command output device 27.

In the controller 18, for example, in the case where there is a combination of a pulling-out amount of the webbing 5 greater than or equal to a set value Xp and a winding back amount less than or equal to a set value Xq, it is determined that a Hi signal is present (input signal=1), and in the case where this combination is not present, it is determined that a Lo signal is present (input signal=0). These determination values plotted as time series are used as input signals. The following Table 1 shows determination values Y0, Y1, and Y2 plotted as time series, and examples of meanings of input signals that correspond to the determination values.

TABLE 1

| Y0 | Y1 | Y2 | |
|---|---|---|---|
| 0 | 0 | 0 | No input (error) |
| 0 | 0 | 1 | Increase in electric current application amount |
| 0 | 1 | 0 | Reduction in electric current application amount |
| 0 | 1 | 1 | Increase in speed |
| 1 | 0 | 0 | Reduction in speed |
| 1 | 0 | 1 | Increase in looseness |
| 1 | 1 | 0 | Reduction in looseness |
| 1 | 1 | 1 | Initialize |

Figure 3:
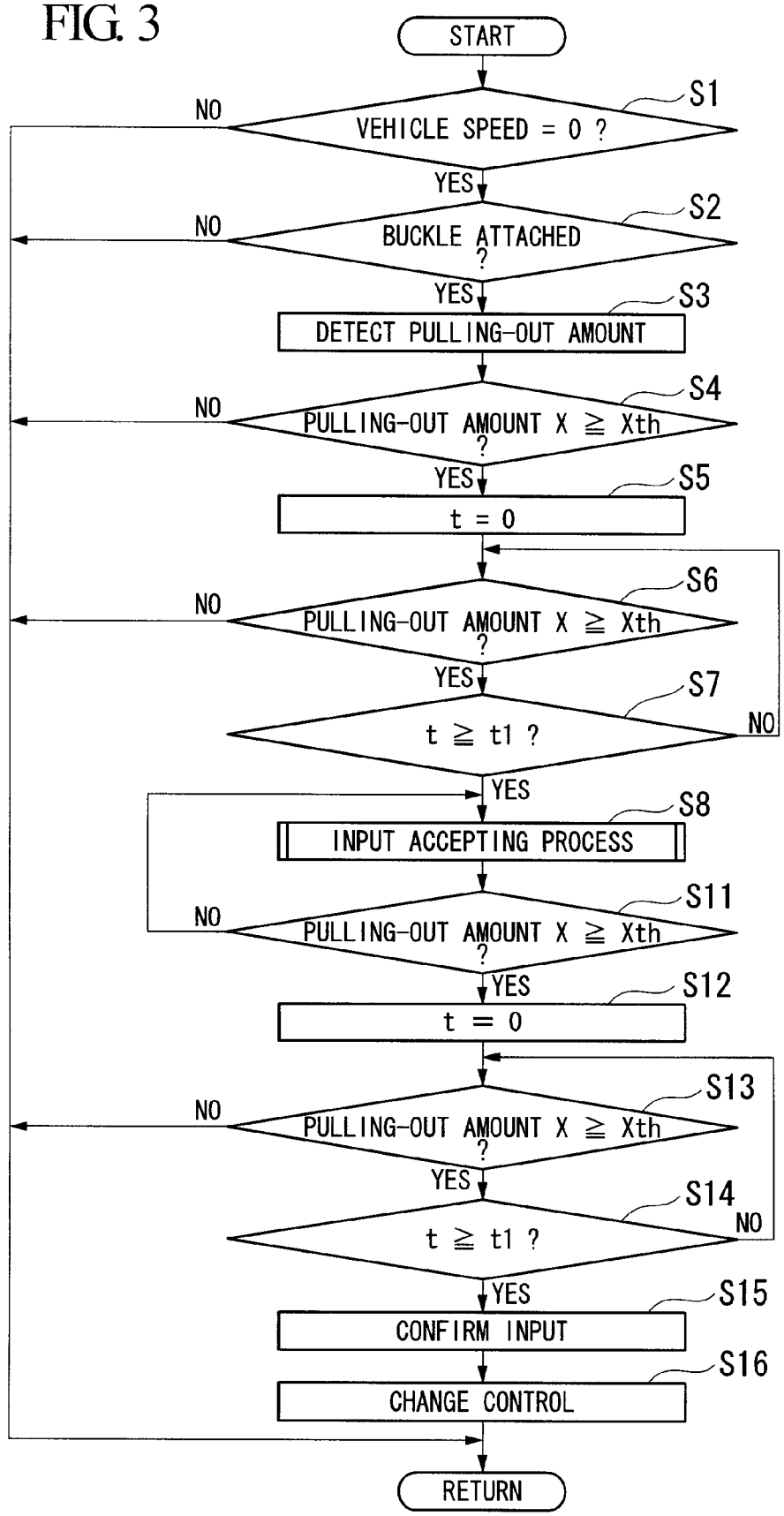
FIG. 3 is a flow chart showing a control of the seatbelt device of the same embodiment.
Figure 4:
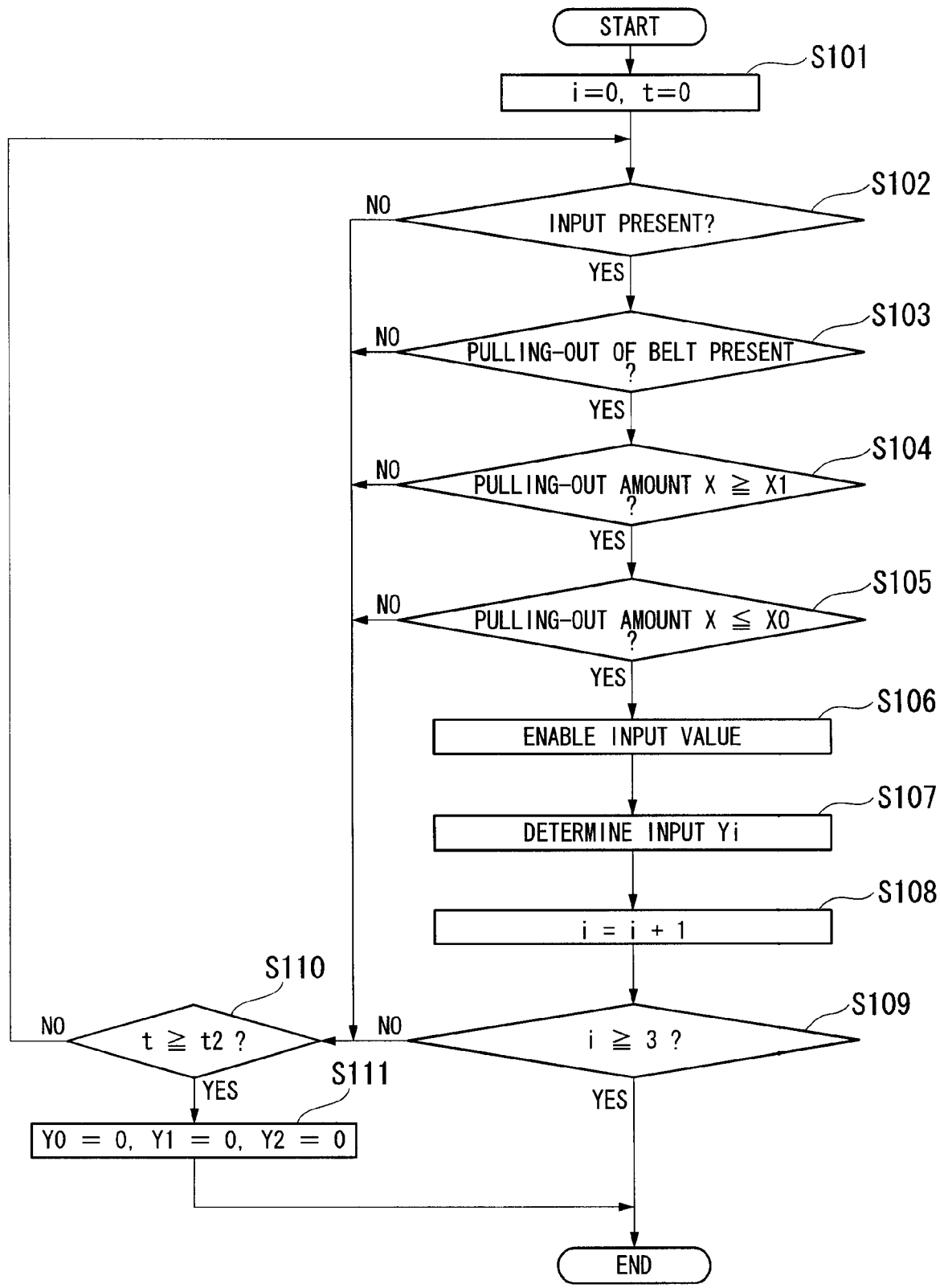
FIG. 4 is a flow chart showing a control of the seatbelt device of the same embodiment.
Figure 5:
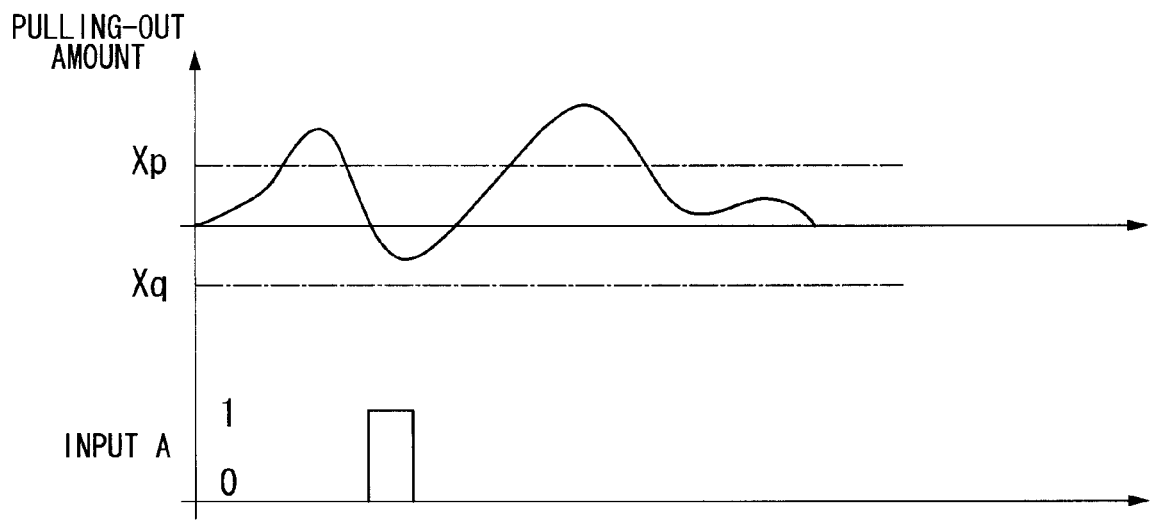
FIG. 5 is a graph showing a relationship, in the same embodiment, between the amount of webbing pulled out and a detection signal.

Hereunder a control performed in the seatbelt device 1 is described, with reference to the flow charts shown in FIG. 3 and FIG. 4.

First, in step S1 shown in FIG. 3, it is determined based on detection values from the vehicle speed sensor 22 whether or not the vehicle is at a stop, and only if the vehicle is at a stop does the flow proceed to step S2. In step S2, it is determined based on a signal from the buckle switch 19 whether or not the seatbelt buckle 9 is attached. Here, only if the seatbelt buckle 9 is attached, does the flow proceed to step S3. In step S3, the pulling-out amount of the webbing 5 is found based on a detection signal from the rotation sensor 14. The pulling-out amount here refers to a relative pulling-out amount (winding position) with respect to a reference pulling-out amount (winding position) of the webbing 5 at the time of a seatbelt attachment.

In the next step S4, it is determined whether or not a pulling-out amount X (winding position) of the webbing 5 is greater than or equal to a set value Xth, and only if the pulling-out amount X is greater than or equal to the set value Xth, does the flow proceed to step S5, and the timer is started. In the next steps S6 and S7, it is determined whether or not the pulling-out amount X of the webbing 5 is greater than or equal to the set value Xth during the period of time t1 that has elapsed, and only if the pulling-out amount X continues to be greater than or equal to the set value Xth, does the flow proceed to the subsequent input accepting process S8.

The process up until this stage is to reject a change to the control setting if the vehicle is moving and if the seatbelt is not attached, and to allow the subsequent input accepting process S8 only if the passenger 3 holds the webbing 5 and continues to pull out the webbing 5 more than the set amount for a predetermined period of time or longer, and the passenger 3 clearly intends to make a change to the control setting.

In the input accepting process S8, as shown in FIG. 4, in step S101 the counter variable i and the timer variable t are made 0, and in the subsequent step S102, the presence of an input signal is determined. If an input signal is present, the flow proceeds to step S103, and if no input signal is present the flow proceeds to step S110. In step S103 it is determined whether or not the webbing 5 has been pulled out, and in steps S104 and S105, whether or not the pulling-out amount X is greater than or equal to the set value X1, and whether or not the pulling-out amount X is less than or equal to the set value X0 are respectively determined. Then only in the case where these conditions are all satisfied, does the flow proceed to step S106 to enable an input value, and otherwise the flow proceeds to step S110. In the case where the input value is enabled in step S106, an input value Yi is determined in the subsequent step S107. In this case, for example, if it is a first time, the value of Y0 takes 0 or 1 (refer to Table 1).

Subsequently, in step S108, 1 is added to the counter variable i, and in the following step S109 it is determined whether or not the counter variable i is greater than or equal to 3, that is to say, whether or not all of the input values Y0, Y1, and Y2 have been determined. If all of the input values Y0, Y1, and Y2 have been determined, the input process is terminated, and if all of them have not been determined, the flow proceeds to step S110 to determine whether or not a set period of time t2 has elapsed. Here, if the set period of time t2 has not elapsed, the flow returns to step S102, and if the set period of time t2 has elapsed, then all of Y0, Y1, and Y2 take 0 and the input processing is terminated. If all of Y0, Y1, and Y2 are 0, an error is returned as shown in Table 1.

Subsequently, the flow returns to the flow shown in FIG. 3, and in steps S11, S12, S13, and S14, as with the steps S4, S5, S6, and S7 described above, it is determined whether or not the pulling-out amount X of the webbing 5 continues to be greater than or equal to the set value Xth during the predetermined period of time t1, and only if this state continues does the flow proceed to step S15 and otherwise the flow returns. The processing here is to re-confirm the intention of the passenger 3 to make a change to the control setting.

In step S15, the input is confirmed, and in the following step S16, the command output device 27 outputs a setting change command based on the confirmed input value to the motor control device 25.

As described above, in this seatbelt device 1, a setting change of the motor control device 25 can be changed by a pulling out/winding back operation by the passenger 3 holding the webbing 5. Accordingly, the control setting of the motor 10 can be reliably changed without the need for adding a dedicated setting switch in the passenger compartment. Therefore, by employing this device, the structure of the interior of the passenger compartment can be simplified, and obstacles to operating other switches can be eliminated.

Moreover, in this seatbelt device 1, an artificial input signal can be accepted by the input determination device 26, by a simple operation where the passenger 3 holds the webbing 5 and pulls for a set period of time or longer. Therefore the operability in changing the settings of the motor control device 25 can be improved.

Figure 6:
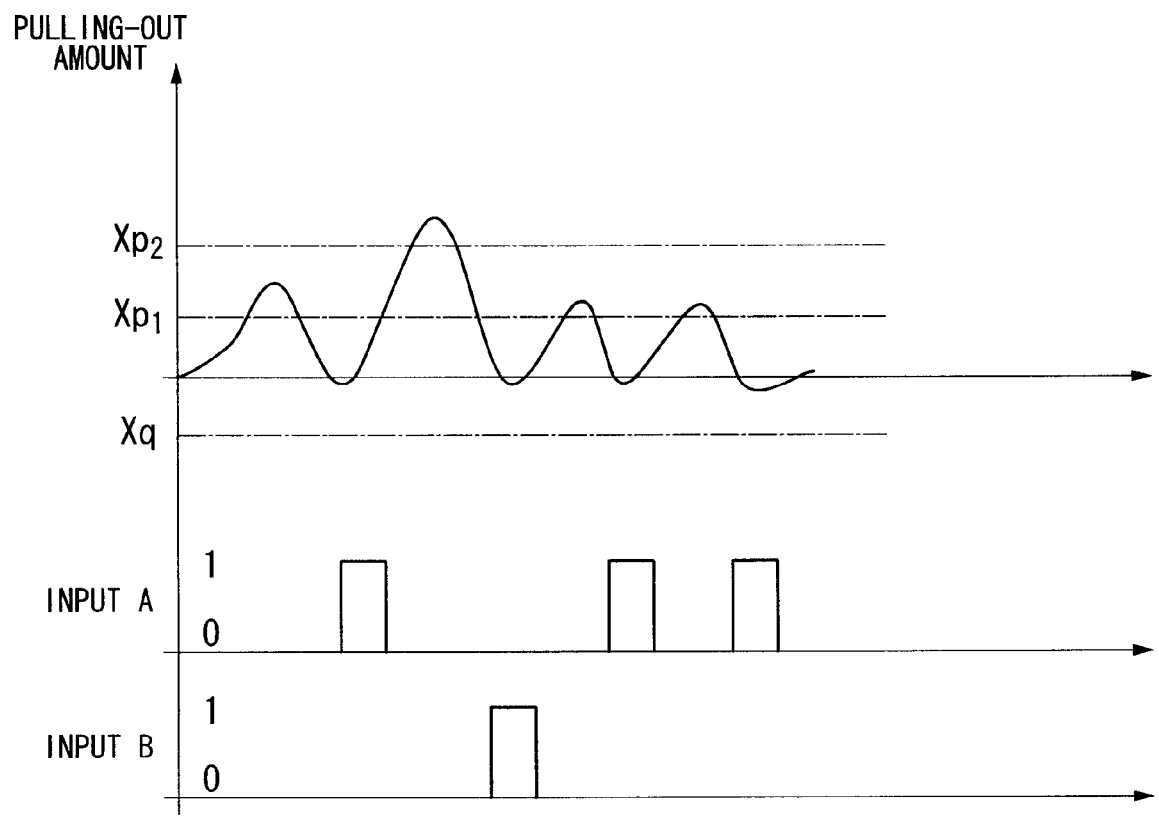
FIG. 6 is a graph showing a relationship, in another embodiment of the present invention, between the amount of webbing pulled out and detection signals.

In the embodiment described above, one type of signal is obtained when the pulling-out amount X of the webbing 5 becomes lower than the set value Xq after the pulling-out amount X has exceeded the set value Xp. However, as shown in FIG. 6, the set value on the upper limit side may be set to two stages Xp1 and Xp2, and the first type of signal may be obtained when the pulling-out amount X of the webbing 5 becomes lower than the set value Xq on the lower limit side after the pulling-out amount X has exceeded the set value Xp1 in the first stage, and a second type of signal may be obtained when the pulling-out amount X of the webbing 5 becomes lower than the set value Xq on the lower limit side after the pulling-out amount X has exceeded the set value Xp2 in the second stage. In this case, the control setting of the motor control device 25 is changed by an input signal obtained as a result of a combination of these signals.

Moreover, in the embodiment described above, an artificial input signal from the passenger 3 is obtained only with a pulling-out/winding-back operation of the webbing 5. However, as shown in the following Table 2, it is also possible to obtain an artificial input signal from the passenger by combining ON/OFF signals of the buckle switch 19 and the operating signal of the shift position sensor 23 along with the signal caused by the operation of the webbing 5.

TABLE 2

| Belt input | Buckle input | Shift input | |
|---|---|---|---|
| 0 | 0 | 0 | No input (error) |
| 0 | 0 | 1 | Increase in electric current application amount |
| 0 | 1 | 0 | Reduction in electric current application amount |
| 0 | 1 | 1 | Increase in speed |
| 1 | 0 | 0 | Reduction in speed |
| 1 | 0 | 1 | Increase in looseness |
| 1 | 1 | 0 | Reduction in looseness |
| 1 | 1 | 1 | Initialize |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seatbelt device for a vehicle comprising:
a webbing that restrains a passenger seated on a seat;
a belt reel on which the webbing is wound;
a webbing winding position detection device that detects the position of the belt wheel over an elapsed period of time;
a motor that rotation-drives the belt reel;
a motor control device that controls the motor;
an input determination device that determines whether or not an input signal, the input signal being a signal corresponding to a change in a position of the webbing during the elapsed period of time, obtained from a seatbelt operation section including the webbing is an artificial input signal; and
a command output device that outputs a setting change command to the motor control device according to a determination result in the input determination device.

2. The seatbelt device for a vehicle according to claim 1, wherein
an artificial input signal input to the input determination device includes at least either one of; a detection signal of a winding position detection device that detects a winding position of the belt reel, and a signal of a buckle switch that detects whether or not a seatbelt buckle is attached.

3. A seatbelt device for a vehicle comprising:
a webbing that restrains a passenger seated on a seat;
a belt reel on which the webbing is wound;
a motor that rotation-drives the belt reel;
a motor control device that controls the motor;
an input determination device that determines whether or not an input signal from a seatbelt operation section including the webbing is an artificial input signal;
a command output device that outputs a setting change command to the motor control device according to a determination result in the input determination device;
further comprising a winding position detection device that detects a winding position of the belt reel, wherein
the input determination device receives a detection signal from the winding position detection device and if a winding position signal continues to be greater than or equal to a set value for a predetermined period of time or longer, determines a subsequent input signal as an artificial input signal.

4. The seatbelt device for a vehicle according to claim 3, wherein
an artificial input signal input to the input determination device includes at least either one of; a detection signal of a winding position detection device that detects a winding position of the belt reel, and a signal of a buckle switch that detects whether or not a seatbelt buckle is attached.

5. A control method of a vehicle seatbelt device provided with: a webbing that restrains a passenger seated on a seat, a belt reel on which the webbing is wound; a motor that rotation-drives the belt reel; a motor control device that controls the motor; and a seatbelt operation section including the webbing, the method comprising:
a winding position detection step of repeatedly detecting a winding position of the belt reel over an elapsed period of time;
an input determination step of determining based on whether a winding position signal obtained in the detection step is greater than or equal to a set value during the elapsed period of time or longer, whether or not a subsequent input signal is an artificial input signal due to an operation of the seatbelt operation section; and
a setting change step of outputting a setting change command to the motor control device in a case where a subsequent input signal is determined as an artificial input signal in the input determination step.

* * * * *